US009256318B2

(12) United States Patent
Voss et al.

(10) Patent No.: US 9,256,318 B2
(45) Date of Patent: Feb. 9, 2016

(54) INPUT DEVICE

(71) Applicant: GM GLOBAL TECHNOLOGY OPERATIONS LLC, Detroit, MI (US)

(72) Inventors: David Voss, Ruesselsheim (DE); Joerg Hedrich, Mainz (DE); Marc Fuerst, Ruesselsheim (DE); Stefan Poppe, Darmstadt (DE); Andreas Lang, Werlgesheim (DE); Michael Wagner, Rimbach (DE); Marius Wrzesniewski, Darmstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 371 days.

(21) Appl. No.: 13/785,663

(22) Filed: Mar. 5, 2013

(65) Prior Publication Data
US 2013/0249869 A1 Sep. 26, 2013

(30) Foreign Application Priority Data

Mar. 21, 2012 (DE) .......................... 10 2012 005 800

(51) Int. Cl.
*G06F 3/041* (2006.01)
*B60K 37/06* (2006.01)
(Continued)

(52) U.S. Cl.
CPC .............. *G06F 3/0418* (2013.01); *B60K 35/00* (2013.01); *B60K 37/06* (2013.01); *G06F 3/04883* (2013.01); *B60K 2350/1028* (2013.01); *B60K 2350/1032* (2013.01);
(Continued)

(58) Field of Classification Search
CPC . G06F 3/0414; G06F 3/0418; G06F 3/04883; B60K 37/06; B60K 35/00; B60K 2350/1028; B60K 2350/1032; B60K 2350/1052; B60K 2350/2052
USPC .......................................................... 345/173
See application file for complete search history.

(56) References Cited

U.S. PATENT DOCUMENTS

| 5,563,632 A | 10/1996 | Roberts |
| 2004/0001048 A1* | 1/2004 | Kraus ................... G06F 3/0421 345/173 |
| 2007/0120830 A1 | 5/2007 | Kaemmerer |

(Continued)

FOREIGN PATENT DOCUMENTS

| DE | 102010063035 A1 | 6/2012 |
| DE | 102011114031 A1 | 3/2013 |

(Continued)

OTHER PUBLICATIONS

UK IPO, British Search Report for Application No. 1303071.3, dated Sep. 11, 2013.

*Primary Examiner* — Jonathan Boyd
(74) *Attorney, Agent, or Firm* — Ingrassia Fisher & Lorenz PC

(57) ABSTRACT

An input device for controlling a device is provided. The input device comprises a sensor surface sensitive to being touched by a foreign body, and an evaluation unit, which is equipped to sense the positions of successively touched points of the sensor surface, and convert them into a control command for the device. The evaluation unit is connected to means for estimating an acceleration acting on the sensor surface and equipped, when converting into the control command, to weight a point touched at a time of intense acceleration change lower than a point touched at a time of slight acceleration change.

17 Claims, 2 Drawing Sheets

(51) Int. Cl.
*G06F 3/0488* (2013.01)
*B60K 35/00* (2006.01)

(52) U.S. Cl.
CPC ............... *B60K 2350/1052* (2013.01); *B60K 2350/2052* (2013.01); *G06F 3/0414* (2013.01)

(56) References Cited

U.S. PATENT DOCUMENTS

2010/0177057 A1* 7/2010 Flint .................. G06F 3/0416 345/174
2011/0082620 A1 4/2011 Small et al.
2011/0187651 A1* 8/2011 Whitlow et al. ............... 345/173
2012/0191993 A1* 7/2012 Drader et al. .................. 713/320

FOREIGN PATENT DOCUMENTS

| EP | 1114746 A2 | 7/2001 |
| KR | 20100001170 A | 1/2010 |
| WO | 2013092725 A1 | 6/2013 |

* cited by examiner

INPUT DEVICE

CROSS-REFERENCE TO RELATED APPLICATION

This application claims priority to German Patent Application No. 10 2012 005 800.4, filed Mar. 21, 2012, which is incorporated herein by reference in its entirety.

TECHNICAL FIELD

The present disclosure relates to an input device, in particular for controlling an electronic device in a motor vehicle.

BACKGROUND

So-called touch screens enjoy increasing popularity as input device for electronic devices such as mobile telephones, minicomputers, entertainment electronic devices etc., since these make possible a comfortable and clear control of numerous functions without a large number of switches, controllers or other input means having to be expensively installed. Instead, images for example of such input means can be displayed on a touch screen and a user can perform an input by touching the displayed image of a switch with the finger, or running the finger over the image of a slide controller, thus imitating the movement with which he would operate a real slide controller.

Other input concepts manage entirely without representing input means. There are concepts, for example, which are based on the idea that the touch screen where forming a type of window through which a detail of a larger image located underneath is visible, which can represent a user surface, a map or the like, and by running the finger over the surface of the touch screen the visible detail of the image can be shifted.

Also known are input devices, e.g. for electronic cash systems, which scan and reproduce the signature performed by a customer with a special input pin on a touch screen.

The versatility of touch screens gives rise to a desire for utilising them also for controlling electronic devices installed in motor vehicles. However, this creates the problem that in a travelling motor vehicle, changing accelerations continually act on the touch screen and its user, be it because of road irregularities, which jolt the vehicle or centrifugal forces that occur when negotiating curves. This can make it difficult for a user to perform a movement on a touch screen exactly as intended. However, when deviations from the intended movement sequence caused through external influences lead to a control error, this is merely irksome to the user in the most benign of cases, since the input has to be cancelled and repeated; under unfavourable conditions an unexpected reaction of a device to a faulty input can irritate the driver of the vehicle, thus impairing the safety of the vehicle.

In order to remedy this problem, an input device was proposed in US 2011/0082620 A1, with which the size of a sensitive region of the touch screen, which has to be touched for triggering a desired action, of a so-called "soft button", is variable as a function of the intensity of the accelerations to which the touch screen is subjected and can, in particular, become larger than the images of keys displayed on the touch screen, which indicate to the user the position of the soft buttons. This conventional solution, however, is only applicable on a touch screen whose soft buttons react to being touched. For operating concepts, which are based on sensing movements of the finger on the surface of the touch screen, this approach is not suitable.

In addition, other objects, desirable features and characteristics will become apparent from the subsequent summary and detailed description, and the appended claims, taken in conjunction with the accompanying drawings and this background.

SUMMARY

The various aspects of the present disclosure provide an input device having a touch-sensitive sensor surface that is suitable for sensing movements of a foreign body such as for example a finger on the sensor surface so that a faultless input is facilitated even under the influence of changing accelerations.

The present disclosure provides that in the case of an input device for controlling a device, which comprises a sensor surface that is sensitive to being touched by a foreign body and an evaluation unit that is equipped to sense the positions of successively touched points of the sensor surface and convert these into a control command for the device, the evaluation unit is connected to means for estimating an acceleration acting on the sensor surface and equipped for weighting a point touched at a time of intense acceleration change with the conversion into the control command than a point touched at a time of slight acceleration change.

In a simple configuration, controlling the device can be based on that the direction and/or the length of a distance covered by the foreign body on the sensor surface is determined by the evaluation unit and passed on to the device to be controlled as a control parameter.

In order to facilitate complex control operations, the evaluation unit can be alternatively equipped to reconstruct a path of the foreign body by means of the sensed positions, to assign the reconstructed path a symbol from a list of symbols, in particular of alpha numerical signs, and to output the symbol in the control command. This assignment of a symbol to a path can be based on OCR-algorithms known per se.

The lower weighting of a point touched upon intense acceleration change can be achieved in particular in that the evaluation unit is equipped to define and off-time which comprises the time of intensive acceleration change and weight all touched points sensed during the off-time less strongly than points sensed outside the off-time.

It is exactly the times, in which the acceleration change is above the limit value at all times, that can be valued as off-time. However it is preferable that the evaluation unit, when an exceeding of the limit value of the acceleration change takes place, defines a time interval of at least one predetermined duration as off-time in each case, which includes the point of time when the limit value is exceeded and in addition can also include times in which the acceleration change is below the limit value. In this way it is possible to take into account the fact that when the finger of the user has been deflected from an intended path over the sensor surface through an intense jolt, a certain time can still elapse even after the jolt has subsided until the finger returns to the originally intended path.

A jolt can also result in that the finger of a user unintentionally loses contact with the sensor surface. In order to take into account this fact, the evaluation unit is preferentially equipped to ignore a failure to touch the sensor surface even if it occurs during an off-time.

The lower weighting of a touched point can be realised in the simplest case in that the control unit weights such a point with zero, i.e. ignores such point.

An ignored part of the movement of the finger can be practically complemented by the evaluation unit in that it interpolates a path portion covered by the finger between a point touched before the ignored part and a part touched after the ignored part.

It can be provided that the off-time in each case terminates exactly upon lapsing of the abovementioned predetermined duration. When at that time the finger does not touch the sensor surface, the evaluation can draw the conclusion from this that the finger movement intended by the user was completed during the off-time and that the conversion into the control command has to be carried out by means of the touched points sensed up to this time.

Alternatively it can be provided that the predetermined duration is merely a minimum duration of the off-time and that following the lapsing of the predetermined duration ends only when the evaluation unit senses a renewed touching of the sensor surface. This makes it possible for the user to precisely aim at a point of the sensor surface at which he wishes to continue the movement of the finger and to precisely finish the movement so that a symbol corresponding to the path of the finger can be detected with high reliability.

The sensor surface is preferentially designed as dynamically activatable display surface. Such a display surface can be equipped, in particular, to display a reconstructed path of the finger.

It is advantageous, in particular, if the evaluation is equipped for reconstructing and displaying a path sensed up to the start of the off-time when such occurs. This facilitates the user to continue a finger movement interrupted as a consequence of a jolt at exactly the point at which the sensing of the movement through the input device was interrupted.

The input device can be advantageously installed in a motor vehicle, in particular, in order to control a radio or other entertainment electronic devices or a navigation system there.

Subject of the present disclosure is also a method for controlling a device, which is based on sensing the movement of a foreign body such as for example a finger on a sensor surface, comprising sensing the positions of points successively touched on the sensor surface by the foreign body and estimating an acceleration acting on the sensor surface. The method can also include converting the sensed positions into a control command, wherein a point touched at a time of intense acceleration change is weighted lower than a point touched at a time of slight acceleration change.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
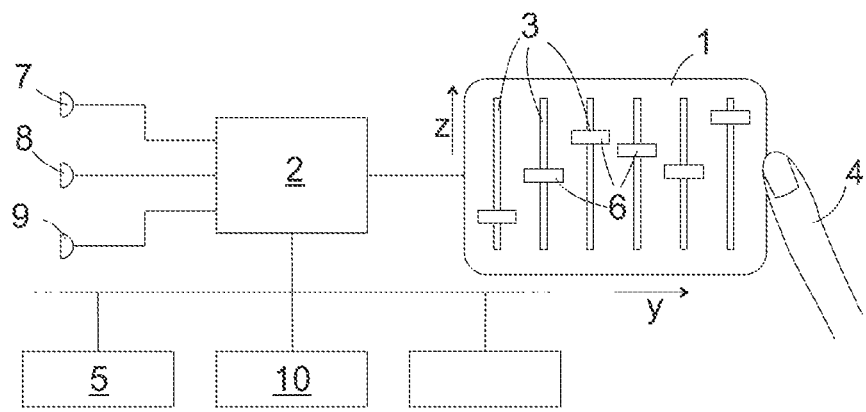
FIG. 1 is a block diagram of an input device according to the present disclosure.

FIG. 1 shows a block diagram of an input device according to the present disclosure installed in a motor vehicle. The input device comprises a sensor surface 1 in the form of a touch screen with a matrix display, in particular an LCD-matrix display. This comprises a multiplicity of pixels, the brightness and/or tone of colour of which can be individually controlled through a control unit 2, in order to be able to reproduce any images on the sensor surface 1, the graphic elements of which comprise a multiplicity of these pixels and for example to be able to represent keys or controllers 3 of a device to be controlled through the input device. In the representation of FIG. 1 the pixels are activated in order to reproduce for example a plurality of slide controllers 3 of an audio amplifier.

When the vehicle is subjected to an intense acceleration change while the finger 4 runs over the sensor surface 1, for example when negotiating a sharp curve or when travelling over a ground irregularity the finger 4 can perform an unintentional movement to the sensor surface 1 and when the evaluation unit 3 evaluates such an involuntary movement for example as an adjusting command for the volume, this can lead to an extremely high volume in the vehicle which irritates the driver. In order to prevent such events, the control unit 2 is connected to means 7, 8, 9 for estimating the amount and/or the direction of an acceleration acting on the sensor surface 1. These means can comprise a speedometer 7 and a steering angle sensor 8, the measurement values of which make possible the calculation of the curvature radius of the path travelled by the motor vehicle and by means of this and the speed of the motor vehicle, the calculation of the acceleration ay acting in vehicle transverse direction y. The sensor surface 1 is generally installed in the instrument panel of the motor vehicle, so that the y-direction runs substantially parallel to said sensor surface 1. In the simplest case, a sensor which is sensitive in a single direction of space that is substantially orthogonal to the y-direction and likewise substantially parallel with the sensor surface 1 is then sufficient as acceleration sensor 9. This direction is designated as z-direction here, even when it not necessarily coincides with the vertical.

It can also be practical to provide a sensor for an acceleration component ax that is substantially perpendicular to the sensor surface 1. Alternatively, an acceleration sensor that is sensitive in three directions of space can be employed; in this case, calculating ay by steering angle and speed is not necessary.

With the example application considered here, it is substantially an acceleration that is parallel to the shifting direction of the grip elements 6, i.e. the acceleration component az, which could result in an unintentional adjustment of a controller 3. According to one exemplary embodiment of the present disclosure, the evaluation unit 2 therefore monitors merely these parallel acceleration components ax, an aborts the evaluation of the signals received from the sensor surface 1 which indicate the position of the finger 4, when the amount of the acceleration change $$|da_z/dt|$$

exceeds a limit value $\dot{\alpha}_{max}$.

According to another exemplary embodiment, the evaluation unit 2 monitors the change of the acceleration in both directions y, z that are parallel to the sensor surface 1 and aborts the evaluation of the finger position signals when $$|da_y/dt|+|da_z/dt|$$

or $$[[da_y/dt]^2+[da_z/dt]^2]^{1/2}$$

exceeds the limit value $\dot{\alpha}_{max}$.

This exemplary embodiment also makes possible suppressing operating errors that can occur when the finger 4 involuntarily deflected to a slide controller that is adjacent to the slide controller 3 controlling of which was actually the intention. Apart from this, it makes possible a uniform handling of the slide controllers 3 independently of their orientation on the sensor surface 1.

Figure 2:
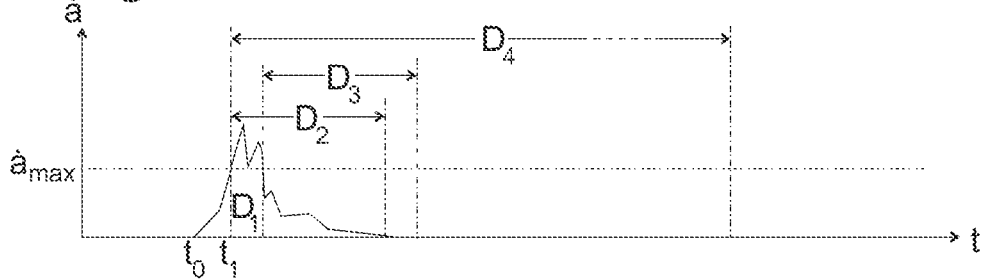
FIG. 2 is an exemplary curve of the acceleration acting on the input device during the course of time and its evaluation through the input device.

There are different possibilities of how the evaluation unit 2 can react to the limit value being exceeded, which will be illustrated in FIG. 2 by means of an exemplary course of time of the acceleration change. For as long as the vehicle travels straight ahead on a level road, the active acceleration is constant and substantially equal to g. When negotiating curves or when accelerating and braking, the acceleration can greatly deviate from g, but it changes only gradually so that it can be largely compensated for by a user when operating the sensor surface 1. In particular, however, when the vehicle travels over a road irregularity, the acceleration changes rapidly and surprisingly so that the user can no longer compensate for this. Such a rapid acceleration change commences in FIG. 2 at the time t0, and at the time t1 the limit value $\dot{\alpha}_{max}$ is exceeded, and the evaluation unit 2 starts ignoring the position signals supplied by the sensor surface 1.

According to a first configuration, the evaluation unit 2 resumes evaluating the position signals as soon as the limit value is undershot at the time t2. In other words, an off-time D1, in which the processing of the position signals is suspended, takes from t1 to t2.

A conceivable alternative is to suspend the evaluation of the position signals during an off-time D2 or D3 after every time the limit value is exceeded, which from the time the limit value is exceeded at the time t1 or, preferentially after the acceleration change at the time t2 has dropped again below the limit value, persists for a fixed duration of for example a few 100 milliseconds. Thus, when a jolt has subsided, the user has sufficient time to reposition the finger 4 at the location of the sensor surface 1 where it found itself at the beginning of the jolt.

A further possibility is to have the off-time D4 continue after each exceeding of the limit value until the finger 4 again touches the sensor surface 1. In this case, a grip element 6 on the sensor surface 1, for example actuated by the user at the time the limit value was exceeded, simply stops in the position it had at the time the limit value was exceeded. In such a case, the user will purely intuitively place the finger again on this grip element 6 for further adjusting, wherein the renewed contact of the finger 4 with the sensor surface 1 results in that the evaluation unit 2 terminates the off-time D4 and again evaluates the position signals supplied by the sensor surface 1.

Figure 3:
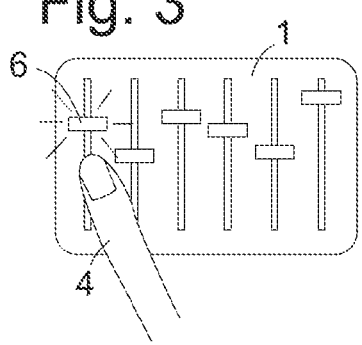
FIG. 3 is a sensor surface of the input device with slide controllers represented thereon in a first exemplary application situation.

The evaluation unit 2 can additionally furnish the user with an instruction that it expects that the grip element 6 is touched again for terminating the off-time by displaying it in a cover deviating from its normal representation or flashing as illustrated in FIG. 3 while the off-time persisted.

Figure 4:
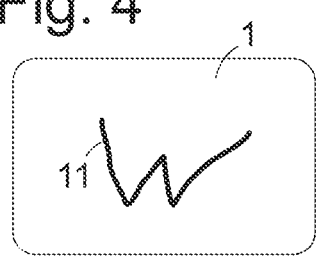
FIG. 4 is the sensor surface with a letter entered by a user by running a finger over the sensor surface and displayed on the sensor surface according to a second exemplary application situation.
Figure 5:
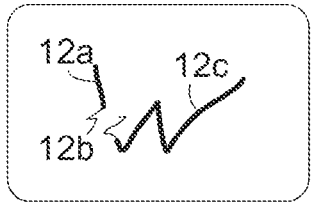
FIG. 5 is the path course of the finger disturbed by a jolt.
Figure 6:
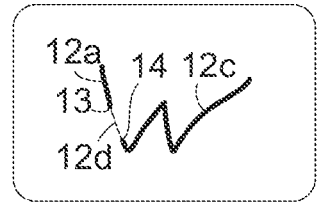
FIG. 6 is the path of the finger reconstructed by the evaluation unit of the input device.
Figure 7:
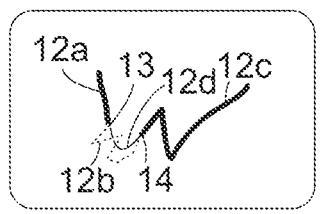
FIG. 7 is a second example of a disturbed and reconstructed path.

A preferred application of the input device according to the present disclosure is the detection of alpha numerical signs, which a user draws on the sensor surface 1 with the finger 4. In that the user draws a plurality of letters on the sensor surface 1 one after the other, he can enter any complex commands in a device control via the input device, e.g. an address of a destination in a navigation device 10. In FIG. 4, a curve 11 on the sensor surface 1 shows the path which the finger 4 can cover on the sensor surface 1 in order to enter the letter "W". If, while the user draws the curve 11 on the sensor surface 1 no exceeding of the acceleration limit value $\dot{\alpha}_{max}$ occurs, the evaluation unit 2 takes into account all position signals supplied by the sensor surface 1 and controls the pixels touched by the finger 4 in order to display the curve 11 on the sensor surface 1 as shown in the Figure. If a jolt occurs the curve 11 is being drawn, the finger 4 deviates from the path actually intended by the user, and the path actually described by the finger 4 can for example follow the course shown in FIG. 5, wherein path portions 12a, 12c where covered before and after respectively and path portion 12b during the off-time. The portion 12b clearly visibly deviates from the actually intended curve 11, the acceleration acting in the off-time can even result in that the contact of the finger 4 with the sensor surface 1 is lost and the path, as shown, is locally interrupted in the portion 12b. The position signals supplied by the sensor surface 1 during the off-time and corresponding to the portion 12b are rejected by the evaluation unit 2 and replaced with an interpolated 12d, as shown in FIG. 6. In the simplest case, the portion 12d can be obtained through linear interpolation, i.e. it connects end points and starting points 13, 14 of the path portions 12a, 12c in a straight line. A greater reliability of the sign detection which is based on the sensed path can be achieved for example through spline interpolation or another interpolation method, with which, as shown in FIG. 7, the interpolated path portion 12d at the end point 13 of the preceding portion 12a or the starting point 14 of the following portion 12c in each case runs in the same direction.

Figure 8:
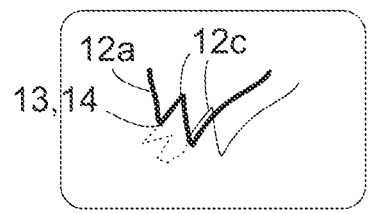
FIG. 8 is a path partially reconstructed after a jolt.

A further processing possibility shown in FIG. 8 comprises entirely omitting an interpolation of the path portion 12b and instead reconstructing the path of the finger in that the end point 13 of the path portion 12a recorded before the off-time is assumed as being identical to the starting point 14 of the path portion 12c recorded after the off-time. Although it is required for this, when the complete path is displayed on the sensor surface 1, to display at least one of the path portions 12a, 12c (here the portion 12c) at a location of the sensor surface 1 other than that which corresponds to the actual path of the finger 4 represented as thin continuous curve, but the path reconstructed thus still has sufficient similarity to the letter to be detected to thus make possible a safe detection.

Figure 9:
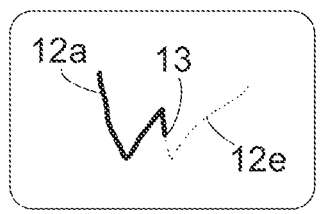
FIG. 9 shows the sensor surface after the user has moved the finger over a path portion up to a start of an off-time.

Even when entering letters the concept already described with reference to FIGS. 2 and 3 can be applied, according to which the evaluation unit 2 will terminate an off-time D4 triggered through an exceeding of the limit value only when the finger 4 of the user again touches the sensor surface 1. FIG. 9 shows the sensor surface 1 after the user has moved the finger 1 over the first path portion 12a as far as to the end point 13 up to the start of an off-time. A path portion 12e represented in interrupted line in the Figure is not yet executed. In that the evaluation unit 2 displays the executed path portion 12a on the sensor surface 1 it provides the user with the possibility of exactly aim the finger at its end point 13, while the off-time D4 persists, and continue the aborted movement along the path portion 11e. When the sensor surface 1 again senses the renewed contact of the finger 4 at the point 12, the evaluation unit terminates the off-time D4 so that the following movement of the finger 4 is sensed and the letter is completely and correctly entered.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An input device for controlling a device, comprising:
a sensor surface that is sensitive to being touched by a foreign body; and
an evaluation unit which is equipped to sense the positions of successively touched points of the sensor surface and convert the sensed positions into a control command for the device,
wherein the evaluation unit is connected to means for estimating an acceleration acting on the sensor surface and equipped to ignore a point touched at a time of intense acceleration change when converting into the control command, and
wherein the evaluation unit is equipped to replace an ignored point by interpolating a path portion covered by the foreign body between a point touched before the ignored point and a point touched after the ignored point.

2. The input device according to claim 1, wherein the evaluation unit is equipped to reconstruct a path of the foreign body by means of the sensed positions, to assign the reconstructed path a symbol from a list of symbols and to output the symbol in the control command.

3. The input device according to claim 2, wherein the list of symbols comprises a list of alpha numerical signs.

4. The input device according to claim 1, wherein the evaluation unit is equipped to ignore a point touched at a time of intense acceleration change in that it defines an off-time which comprises the time of intense acceleration change and ignores all such points sensed in the off-time.

5. The input device according to claim 4, wherein the evaluation unit is equipped, when at a time $t_1$ a limit value of the acceleration is exceeded to define as off-time a time interval of at least a predetermined duration which includes the time.

6. The input device according to claim 4, wherein the evaluation unit is equipped to ignore non-touching of the sensor surface if it occurs at an off-time.

7. The input device according to claim 4, wherein after expiration of the predetermined duration the off-time ends only when the evaluation unit senses a renewed touching of the sensor surface.

8. The input device according to claim 4, wherein the sensor surface is designed as dynamically activatable display surface.

9. The input device according to claim 8, wherein the display surface is equipped to display a reconstructed path.

10. The input device according to claim 8, wherein the evaluation unit is equipped when an off-time occurs to reconstruct and display a path sensed up to the start of the off-time.

11. A motor vehicle, comprising:
a device;
an input device for controlling the device, the input device including a sensor surface that is sensitive to being touched by a foreign body and an evaluation unit which is equipped to sense the positions of successively touched points of the sensor surface and convert the sensed positions into a control command for the device, the sensor surface being a dynamically activatable display surface,
wherein the evaluation unit is connected to means for estimating an acceleration acting on the sensor surface and equipped to ignore a point touched at a time of intense acceleration change when converting into the control command, and
wherein the evaluation unit is equipped to replace an ignored point by interpolating a path portion covered by the foreign body between a point touched before the ignored point and a point touched after the ignored point.

12. The motor vehicle according to claim 11, wherein the evaluation unit is equipped to reconstruct a path of the foreign body by means of the sensed positions, to assign the reconstructed path a symbol from a list of symbols and to output the symbol in the control command.

13. The motor vehicle according to claim 11, wherein the evaluation unit is equipped to ignore a point touched at a time of intense acceleration change in that it defines an off-time which comprises the time of intense acceleration change and ignores all such points sensed in the off-time.

14. The motor vehicle according to claim 13, wherein the evaluation unit is equipped, when at a time $t_1$ a limit value of the acceleration is exceeded to define as off-time a time interval of at least a predetermined duration which includes the time.

15. The motor vehicle according to claim 13, wherein the evaluation unit is equipped to ignore non-touching of the sensor surface if it occurs at an off-time.

16. A method for controlling a device comprising:
sensing the positions of points successively touched by a foreign body on a sensor surface;
estimating an acceleration acting on the sensor surface;
converting the sensed positions into a control command;
ignoring a point touched at a time of intense acceleration change; and
replacing an ignored point by interpolating a path portion covered by the foreign body between a point touched before the ignore point and a point touched after the ignored point.

17. The method according to claim 16, wherein converting the sensed positions into a control command comprises reconstructing a path of the foreign body on the sensor surface and assigning a symbol from a list of symbols to the reconstructed path.

* * * * *